United States Patent
Wei

(10) Patent No.: US 10,862,172 B2
(45) Date of Patent: Dec. 8, 2020

(54) METHOD AND DEVICE FOR IDENTIFYING MASTER AND SLAVE BATTERY PACKS

(71) Applicant: Contemporary Amperex Technology Co., Limited, Ningde (CN)

(72) Inventor: Zhili Wei, Ningde (CN)

(73) Assignee: Contemporary Amperex Technology Co., Limited, Fujian (CN)

( * ) Notice: Subject to any disclaimer, the term of this patent is extended or adjusted under 35 U.S.C. 154(b) by 378 days.

(21) Appl. No.: 15/988,254

(22) Filed: May 24, 2018

(65) Prior Publication Data

US 2018/0342772 A1 Nov. 29, 2018

(30) Foreign Application Priority Data

May 26, 2017 (CN) .......................... 2017 1 0385335

(51) Int. Cl.
*H01M 10/42* (2006.01)
*H01M 2/10* (2006.01)

(52) U.S. Cl.
CPC ....... *H01M 10/425* (2013.01); *H01M 2/1016* (2013.01); *H01M 10/4207* (2013.01); *H01M 2/1077* (2013.01); *H01M 2010/4278* (2013.01)

(58) Field of Classification Search
CPC ......... H01M 10/42–488; H01M 2/1016–1088; H02J 7/00032–00045; H02J 7/0042–0045
See application file for complete search history.

(56) References Cited

U.S. PATENT DOCUMENTS

| | | | | |
|---|---|---|---|---|
| 5,717,937 A | * | 2/1998 | Fritz | ....................... G06F 1/263 713/300 |
| 2013/0057076 A1 | * | 3/2013 | Lavender | ............. H01M 10/42 307/80 |

(Continued)

FOREIGN PATENT DOCUMENTS

| | | |
|---|---|---|
| CN | 102931702 A | 2/2013 |
| CN | 103390921 A | 11/2013 |

(Continued)

OTHER PUBLICATIONS

EP18275071.1 remarks, Mar. 18, 2020. (Year: 2020).*

(Continued)

*Primary Examiner* — Rexford N Barnie
*Assistant Examiner* — David A Shiao
(74) *Attorney, Agent, or Firm* — Arent Fox LLP

(57) ABSTRACT

Embodiments of the present application provide a method and device for identifying a master and slave battery packs. The method includes a first battery pack obtaining, after it is connected to a battery cabinet, its identifier, and obtaining identifiers of other battery packs in the battery cabinet through a communication bus. The total number of the battery packs is N, where N is a positive integer. The method may sort the identifiers of the first battery pack and of the other battery pack to obtain a sorted result. The method may identify the master battery pack and slave battery packs among the first battery pack and the other battery packs according to the sorted result. Each of the battery packs connected to a battery cabinet may automatically identify the master battery pack and slave battery packs according to their identifiers, eliminating manual configuration by a user, and improving configuration efficiency.

16 Claims, 4 Drawing Sheets

(56) References Cited

U.S. PATENT DOCUMENTS

| | | | |
|---|---|---|---|
| 2015/0221993 A1* | 8/2015 | Wang | H01M 10/425 |
| | | | 429/92 |
| 2016/0254684 A1* | 9/2016 | Gothoskar | H02J 7/0027 |
| | | | 455/572 |
| 2016/0359329 A1 | 12/2016 | Kim et al. | |
| 2018/0166718 A1* | 6/2018 | Nishigai | H01M 8/04992 |
| 2018/0323454 A1* | 11/2018 | Yamane | H01M 8/04679 |
| 2018/0375337 A1* | 12/2018 | Nishigai | H02J 3/387 |

FOREIGN PATENT DOCUMENTS

| | | |
|---|---|---|
| CN | 106253363 A | 12/2016 |
| GB | 2494187 A | 3/2013 |

OTHER PUBLICATIONS

The First Office Action and search report dated Aug. 26, 2019 for Chinese Application No. 201710385335.3, 13 pages.
Extended European Search Report received in corresponding European Application No. 18275071 dated Oct. 1, 2018.

* cited by examiner

METHOD AND DEVICE FOR IDENTIFYING MASTER AND SLAVE BATTERY PACKS

CROSS-REFERENCE TO RELATED APPLICATION(S)

This application claims the benefit of Chinese Patent Application No. CN201710385335.3, entitled "METHOD AND DEVICE FOR IDENTIFYING MASTER AND SLAVE BATTERY PACKS" and filed on May 26, 2017 in the State Intellectual Property Office of the People's Republic of China (PRC) (SIPO).

BACKGROUND

Field

The present invention relates to the technical field of energy storage system, and in particular to a method and device for identifying master and slave battery packs.

Background

Energy storage technology with lithium ion batteries is rapidly evolving. Lithium energy storage applications range from small, portable, personal energy storages (such as a mobile phone's auxiliary back-up power supplies), to mid-sized home energy storages used to store the green energies generated by windmills or solar panels, to large-scale enterprise or public-level energy storages used for various applications.

Large-capacity lithium ion battery energy storage systems typically employ a plurality of independent battery cabinets that are connected in series or in parallel. When the plurality of independent battery cabinets are connected in parallel, a battery pack may be connected to each of the battery cabinets. When the battery cabinets are in operation, a master battery pack may be used to coordinate the operations of the plurality of battery packs, as well as to communicate information with exterior systems.

SUMMARY

One or more embodiments of the present application provide a method and device for identifying master and slave battery packs. A battery cabinet is able to determine the master battery pack and slave battery packs by itself, thereby improving the configuration of the master battery pack and slave battery packs in the battery cabinet.

One or more embodiments of the present application provide a method for identifying a master battery pack. The method includes a first battery pack obtaining an identifier of the first battery pack after the first battery pack is connected to a battery cabinet. The method includes the first battery pack identifying itself as the master battery pack if/when, after the first battery pack is connected to the battery cabinet, the first battery pack does not obtain identifiers of one or more other battery packs through a communication bus.

In one embodiment, the method also includes the first battery pack obtaining identifiers of one or more other battery packs in their respective battery cabinets through the communication bus. The number of the one or more other battery packs plus the first battery pack is N, where N is a positive integer. The method further includes the first battery pack sorting the identifier of the first battery pack and the identifiers of the one or more other battery packs to obtain a sorted result. The method further includes the first battery pack identifying the master battery pack and one or more slave battery packs among the first battery pack and the one or more other battery packs according to the sorted result.

In one aspect, the master battery pack controls the operations of the one or more slave battery packs.

In one aspect, the identifier of the first battery pack and the identifiers of the one or more other battery packs are each a unique address code; or the identifier of the first battery pack and the identifiers of the one or more other battery packs are each a unique serial number.

In one aspect, the first battery pack sorting the identifier of the first battery pack and the identifiers of each of the one or more other battery packs includes sorting all of the identifiers according to an ascending order of all of the identifiers to obtain the sorted result, or sorting all of the identifiers according to a descending order of all of the identifiers to obtain the sorted result.

In one aspect, the first battery pack identifying the master battery pack and the one or more slave battery packs among the first battery pack and the one or more other battery packs includes identifying the battery pack with the largest identifier as the master battery pack, and other battery packs as the slave battery packs according to the sorted result; or identifying the battery pack with the smallest identifier as the master battery pack, and other battery packs as the slave battery packs according to the sorted result.

In one aspect, the method further includes the first battery pack detecting that the master battery pack is removed from its battery cabinet, detecting that a new battery pack is not connected to any of the battery cabinets within a time period after the master battery pack is removed, and identifying a new master battery pack and new slave battery packs according to the sorted result.

In one aspect, the first battery pack identifying the new master battery pack and the new slave battery packs according to the sorted result includes identifying the battery pack with the largest identifier excluding the removed master battery pack as the new master battery pack, and all other battery packs as the new slave battery packs according to the sorted result, or identifying the battery pack with the smallest identifier excluding the removed master battery pack as the new master battery pack, and all other battery packs as the new slave battery packs according to the sorted result.

One or more embodiments of the present application further provide a method for identifying a new master battery pack and new slave battery packs. The method includes an $i^{th}$ one of a plurality of first battery packs detecting that a master battery pack is removed from a battery cabinet, where i ranges from 1 to N. N is a positive integer, where N is the total number of the first battery packs connected to their respective battery cabinets. The plurality of the first battery packs have their respective identifiers. The method includes the $i^{th}$ one of the first battery packs detecting that a new battery pack is connected to one of the battery cabinets within a time period after the master battery pack is removed. The method also includes the $i^{th}$ one of the first battery packs obtaining an identifier of the new battery pack. The method further includes the $i^{th}$ one of the first battery packs sorting the identifiers of the first battery packs and the identifier of the new battery pack to obtain a sorted result. The method further includes the $i^{th}$ one of the first battery packs identifying the new master battery pack and the new slave battery packs among the first battery packs and the new battery pack according to the sorted result.

In one aspect, the identifiers of the first battery packs and the identifier of the new battery pack are each a unique address, or the identifiers of the first battery packs and the identifier of the new battery pack are each a unique serial number.

In one aspect, the $i^{th}$ one of the first battery packs identifying the new master battery pack and the new slave battery packs includes identifying the battery pack with the largest identifier as the new master battery pack, and the other battery packs as the new slave battery packs according to the sorted result, or identifying the battery pack with the smallest identifier as the new master battery pack, and the other battery packs as the new slave battery packs according to the sorted result.

One or more embodiments of the present invention further provide a device for identifying a master battery pack. The device is arranged in a first battery pack, and includes an obtaining module configured to obtain an identifier of the first battery pack after the first battery pack is connected to a battery cabinet. The device also includes an identifying module configured to identify the first battery pack as a master battery pack if/when, after the first battery pack is connected to the battery cabinet, the first battery pack does not obtain identifiers of one or more other battery packs through a communication bus.

In one embodiment, the obtaining module is further configured to obtain identifiers of one or more other battery packs in their respective battery cabinets through the communication bus. The number of the one or more other battery packs plus the first battery pack is N, wherein N is a positive integer. The device also includes a sorting module configured to sort the identifier of the first battery pack and the identifiers of the one or more other battery packs to obtain a sorted result. The identifying module is further configured to identify the master battery pack and one or more slave battery packs among the first battery pack and the one or more other battery packs according to the sorted result.

In one aspect, the identifier of the first battery pack and the identifiers of the one or more other battery packs are each a unique address; or the identifier of the first battery pack and the identifiers of the one or more other battery packs are each a unique serial number.

In one aspect, the sorting module is further configured to sort all of the identifiers according to an ascending order of all of the identifiers to obtain the sorted result, or to sort all of the identifiers according to a descending order of all of the identifiers to obtain the sorted result.

In one aspect, the identifying module is further configured to identify the battery pack with the largest identifier as the master battery pack, and other battery packs as the slave battery packs according to the sorted result, or to identify the battery pack with the smallest identifier as the master battery pack, and other battery packs as the slave battery packs according to the sorted result.

In one aspect, the identifying module is further configured to detect that the master battery pack is removed from its battery cabinet, to detect that a new battery pack is not connected to any of the battery cabinets within a time period after the master battery pack is removed, and to identify a new master battery pack and new slave battery packs according to the sorted result.

In one aspect, the identifying module is further configured to identify the battery pack with the largest identifier excluding the removed master battery pack as the new master battery pack, and all other battery packs as the new slave battery packs according to the sorted result, or to identify the battery pack with the smallest identifier excluding the removed master battery pack as the new master battery pack, and all other battery packs as the new slave battery packs according to the sorted result.

In one aspect, the obtaining module is further configured to detect that the master battery pack is removed from the battery cabinet of the master battery pack. The obtaining module is further configured to detect that a new battery pack is connected to one of the battery cabinets within a time period after the master battery pack is removed, and to obtain an identifier of the new battery pack. The sorting module is further configured to sort all of the identifiers including the identifier of the new battery pack to obtain a sorted result. The identifying module is further configured to identify the new master battery pack and the new slave battery packs among all of the battery packs including the new battery pack according to the sorted result.

In one aspect, the identifiers of the all of the battery packs including the identifier of the new battery pack are each a unique address, or the identifiers of all of the battery packs including the identifier of the new battery pack are each a unique serial number.

Embodiments of the present application provide a method and device for identifying a master battery pack and slave battery packs. After a first battery pack is connected to a battery cabinet, the first battery pack obtains its own identifier. If the first battery pack obtains identifiers of other battery packs in their respective battery cabinets through a communication bus, the first battery pack, according to the sorted result of the identifiers of all the battery packs, identifies the master battery pack and the slave battery packs among the first battery pack and the other battery packs. If the first battery pack does not obtain the identifiers of any other battery packs in their battery cabinets through the communication bus, the first battery pack identifies itself as the master battery pack. According to the technical solution provided in the embodiments of the present application, each of the battery packs connected to their respective battery cabinet is preferably able to automatically identify a master battery pack and slave battery packs according to the identifiers of the battery packs. The solution does not require a user to manually configure the battery packs one by one. Thus, the complexity of the operation is reduced, and the efficiency of configuration is improved. In this way, embodiments of the present application address the shortcomings in the existing technology of requiring a user to manually configure battery packs one by one, thereby avoiding the complicated and time-consuming configuration process and the resulting low configuration efficiency.

BRIEF DESCRIPTION OF THE DRAWINGS

In order to more clearly describe the technical solutions of the one or more embodiments of the present applications, the drawings for the one or more embodiments will be briefly described below. It is understood that the drawings accompanied by the detailed description set forth below represent only some embodiments of the present application. A person of ordinary skill in the art may readily derive other drawings on the basis of these drawings without inventive skills and these drawings would still be encompassed within the scope of the disclosure of the present application.

DETAILED DESCRIPTION

In order to allow a better understanding of the technical solutions of the present application, various embodiments of the present application will be described in detail below with reference to the accompanying drawings. It should be understood that the embodiments described herein represent only some embodiments of the present application and that the innovative aspects of the present application may be embodied in many different forms. Other embodiments may be readily apparent to a person of ordinary skill in the art on the basis of the embodiments described herein without the need to exercise inventive skills and all these embodiments would still fall within the scope of the present application.

The terms used in the one or more embodiments of the present application are provided for the purpose of illustrating the embodiments only and are not intended to limit the present application. For example, the singular forms "a," "an," and "this," and others used in the one or more embodiments of the present application and the appended claims are intended to include the plural forms unless the context clearly dictates otherwise.

In existing technology, the determination of the master battery pack and the slave battery packs in a battery cabinet may require a user to manually configure them one by one. The operation is complicated and time-consuming. In addition, the configuration efficiency is relatively low. Embodiments of the present application provide a method and a system for configuring a master battery pack and slave battery packs automatically.

Embodiment I

Figure 1:
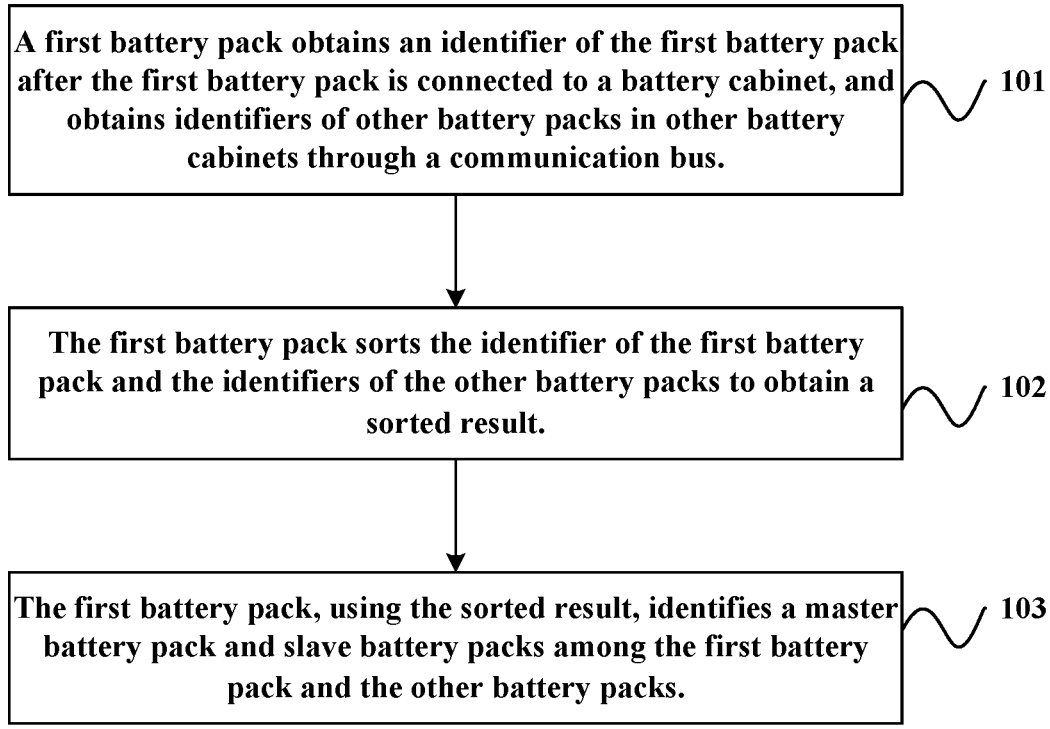
FIG. 1 is an exemplary flow chart of a first method for identifying a master battery pack and slave battery packs provided by one or more embodiments of the present application.
Figure 2:
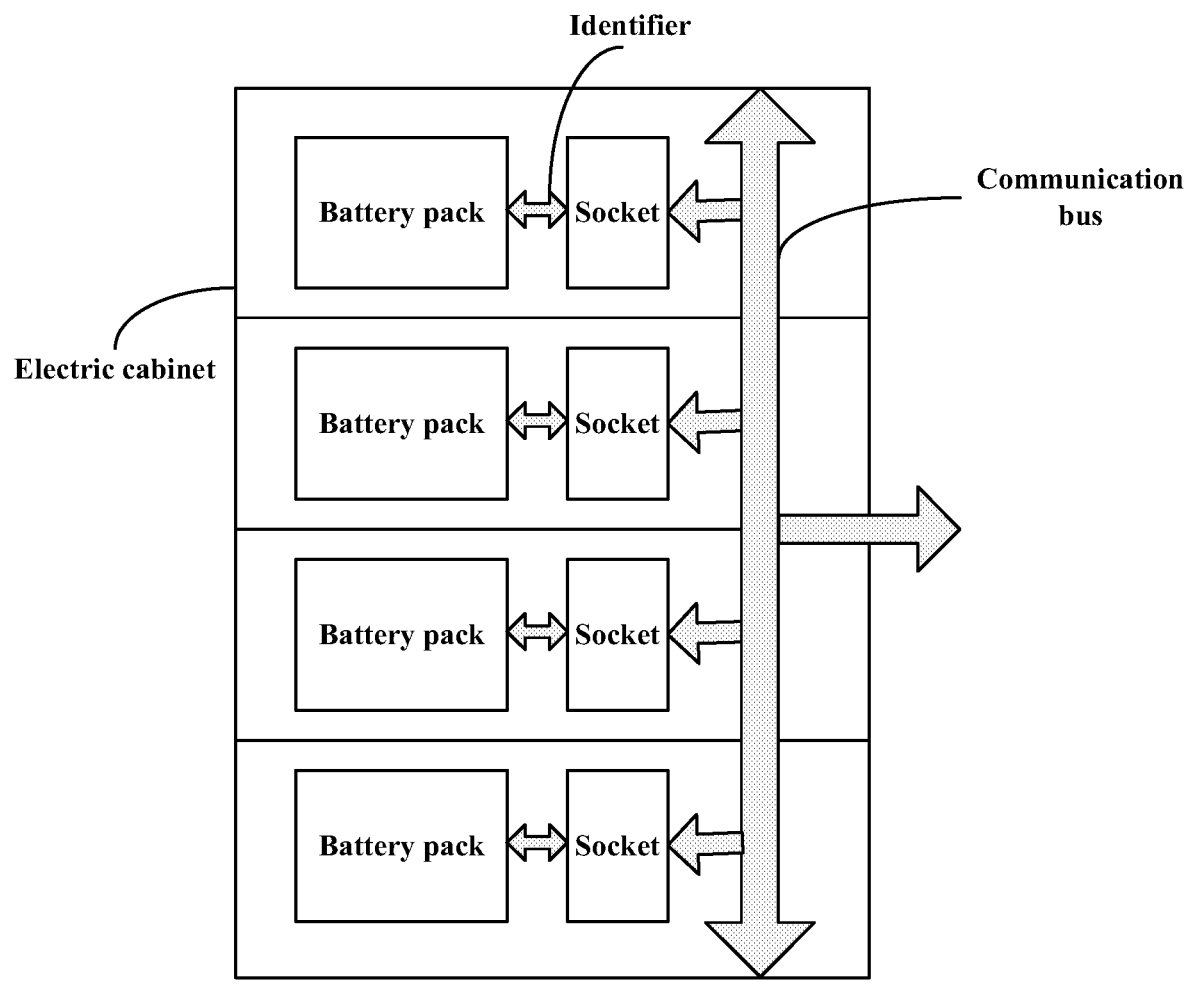
FIG. 2 is a schematic view of the structure of the battery cabinet provided by one or more embodiments of the present application.

FIG. 1 is an exemplary flow chart of a first method for identifying a master battery pack and slave battery packs provided by one or more embodiments of the present application. FIG. 2 is a schematic view of the structure of the battery cabinet provided by one or more embodiments of the present application. As shown in FIGS. 1 and 2, the method for identifying the master battery pack and slave battery packs in accordance with the embodiments includes the steps or blocks described herein.

In block 101, a first battery pack obtains an identifier of the first battery pack after the first battery pack is connected to a battery cabinet. The first battery pack may obtain identifiers of other battery packs in other battery cabinet through a communication bus. In one or more embodiments of the present application, the number of the other battery packs is N, and N is a positive integer.

As shown in FIG. 2, in one or more embodiment of the present application, each battery cabinet has a socket or an interface through which the battery pack is connected to the battery cabinet. The battery cabinet is also provided with a communication bus used for communicating with other battery cabinets, as well as for communicating with systems outside of the battery cabinet.

In one or more embodiments of the present application, each battery cabinet may be populated by connecting to a battery pack or may be unpopulated by not connecting to a battery pack. The socket or the interface in each battery cabinet may be configured with an identifier. The identifier may be provided through an address line in the socket or the interface, and the identifier may be obtained by the battery pack. It is understood that the number of identifiers may vary with the number of battery cabinets.

Through the communication bus, each battery cabinet may broadcast a message when it has been connected with a battery pack and may receive broadcast messages from other battery cabinets to learn if each battery cabinet has been connected with a battery pack. In one or more embodiments of the present application, a first battery pack may refer to any battery pack connected to a battery cabinet, and correspondingly, other battery packs may refer to any other battery packs connected to the other battery cabinets except the first battery pack.

For example, a power cabinet may provide four battery cabinets, and each battery cabinet may be connected with a battery pack. In such case, one of the battery packs may be referred to as the first battery pack, and the remaining three battery packs may be referred to as the other battery packs.

After the first battery pack is connected to a battery cabinet, the first battery pack may use an address provided by the address lines in the socket as its own identifier. The first battery pack may broadcast its identifier via the communication bus to the other battery packs. Correspondingly, after each of the other battery packs is connected to its respective battery cabinet, each of the other battery packs may use the address provided by the address lines in the respective socket as its own identifier. Each of the other battery packs may broadcast its identifier via the communications bus to the first battery pack and all other battery packs. It is understood that each battery pack in the power cabinet may know each other's identifiers.

In one aspect, the identifier of the first battery pack and the identifiers of each of the other battery packs are unique addresses. In another aspect, the identifier of the first battery pack and the identifiers of each of the other battery packs are unique serial numbers. For example, the addresses may be 0X00, 0X01, etc., or A01, A02, etc. The serial numbers may be No. 1, No. 2, etc.

For example, four battery cabinets may be provided in a power cabinet, and the addresses of the battery cabinets may be 0X00, 0X01, 0X02 and 0X03, respectively. In such case, the identifier of the battery pack connected to the battery cabinet with address 0X00 is 0X00, and the identifier of the battery pack connected to the battery cabinet with address 0X01 is 0X01, and so on.

In another embodiment, a power cabinet may be provided with eight battery cabinets. The serial numbers of the battery cabinets may be from No. 1 to No. 8. In such case, the identifier of the battery pack connected to the battery cabinet with serial No. 1 is No. 1, the identifier of the battery pack connected to the battery cabinet with serial No. 2 is No. 2, and so on.

In block 102, the first battery pack sorts the identifier of the first battery pack and the identifiers of each of the other battery packs, and obtains a sorted result. For example, after obtaining its own identifier, as well as the identifiers of each of the other battery packs via the communication bus, the first battery pack sorts the identifiers according to a preset sorting rule to obtain a corresponding sorted result. In one aspect, the first battery pack may sort the identifiers according to an ascending order of the identifiers. In another aspect, the first battery pack may sort the identifiers according to a descending order of the identifiers.

It is understood that while only two sorted results of the identifiers are described in one or more embodiments of the present application, other sorted results may be obtained in accordance with the requirements of different power cabinets. Therefore, the sorting rules are not limited to those for obtaining the two sorted results provided in the embodiments of the present application.

In an aspect, the first battery pack may put its own identifier first in the sorted result to represent itself, and then put the sorted result obtained from applying the sorting rule to the identifier of the first battery pack and the identifiers of all the other battery packs next. Correspondingly, each of the other battery packs, in the sorting step, may put its own identifier first in the sorted result to represent itself, and then put the sorted result obtained from applying the sorting rule to the identifier of the first battery pack and the identifiers of all the other battery packs after its own identifier.

For example, there may be four battery cabinets provided in a power cabinet. The addresses of the four battery cabinets may be 0X00, 0X01, 0X02, and 0X03 in sequence. The first battery pack may be connected to the battery cabinet whose address is 0X00, and the other three battery packs may be connected to the battery cabinets with the addresses 0X01, 0X02, 0X03. In addition, the identifiers may be sorted according to an ascending order of the identifiers. In such case, the sorted result of the first battery pack may be 0X00—0X00, 0X01, 0X02, 0X03, and the sorted result of the battery pack in the battery cabinet with the address 0X01 may be 0X01—0X00, 0X01, 0X02 and 0X03, and so on.

In block 103, The first battery pack, using the sorted result, identifies a master battery pack and slave battery packs among the first battery pack and the other battery packs. For example, the first battery pack may, using the sorted result and in accordance with a designated identification rule, identify a master battery pack and slave battery packs among the first battery pack and the other battery packs. In one aspect of the identification rule, the first battery pack, using the sorted result, may identify the battery pack with the largest identifier as a master battery pack, and each of the other battery packs as a slave battery pack. In another aspect, the first battery pack, using the sorted result, may identify the battery pack with the smallest identifier as a master battery pack, and each of the other battery packs as a slave battery pack.

It is understood that while only two identification rules have been described in one or more embodiments of the present application, other identification rules may be adopted in accordance with the requirements of different power cabinets. Therefore, the identification rules are not limited to the two identification rules provided in the embodiments of the present application.

In one aspect, the first battery pack may compare its own identifier with the identifier of the master battery pack identified from the sorted result. If the identifier of the first battery pack is the same as that of the master battery pack, the first battery package is the master battery pack. Correspondingly, one of the other battery packs may compare its own identifier with the identifiers of the one or more slave battery packs identified from the sorted result. If the identifier of one of the other battery packs is the same as that of one of the slave battery packs, such one of the other battery pack is the slave battery pack.

For example, there may be four battery cabinets provided in a power cabinet. The addresses of the battery cabinet may be 0X00, 0X01, 0X02, and 0X03 in sequence. The first battery pack may be connected to the battery cabinet whose address is 0X00, and the other three battery packs may be connected to the battery cabinets with the addresses 0X01, 0X02, and 0X03, in that order. The sorting rule may sort the identifiers of the battery packs according to an ascending order of the identifiers, and the identification rule may select the battery pack with the smallest identifier as the master battery pack. In such case, the sorted result in the first battery pack may be 0X00—0X00, 0X01, 0X02, and 0X03. Since the identifier of the first battery pack is the smallest, the identification rule may determine that the first battery pack is the master battery pack. In addition, the sorted result of the other battery pack in the battery pack cabinet with the address 0X01 may be 0X01—0X00, 0X01, 0X02, 0X03. Accordingly, the identification rule may determine that such other battery pack is a slave battery pack, and so on.

In one or more embodiment of the present application, once one battery pack is identified as the master battery pack, all other battery packs are identified as the slave battery packs. In another embodiment of the present application, after one battery pack is identified as the master battery pack, when a new battery pack is added, the new battery pack may be identified as a slave battery pack.

In one or more embodiments of the present application, the master battery pack may control the operation of the slave battery packs, as well as communicate with one or more external systems via the communication bus. In one embodiment, if only one battery pack is connected to a power cabinet, after the battery pack obtains its identifier and if/when the battery pack does not obtain the identifier of another battery pack via the communication bus, the first battery pack may identify itself as the master battery pack and accordingly may operate independently. In one embodiment, the identifier of the first battery pack and the identifiers of each of the other battery packs are each a unique address. In another embodiment, the identifier of the first battery pack and the identifiers of each of the other battery packs are each a unique serial number.

In one or more embodiments of the present application, a device may be configured to execute the blocks 101 to 103 to identify a master battery pack and the slave battery packs. The device may be located in the battery pack. In other embodiments of the present application, the device may be located in the battery cabinet, in the power cabinet, or may be external to the power cabinet and may communicate with the battery cabinets through the communication bus.

Embodiments of the present application provide a method for identifying a master and slave battery packs. After a first battery pack is connected to a battery cabinet, the first battery pack may obtain its own identifier. When the first battery pack obtains identifiers of the other battery packs connected to the other battery cabinets through a communication bus, the first battery pack may sort the identifiers of all the battery packs. The first battery may, using the sorted result of the identifiers of all the battery packs, identify a master battery pack and the slave battery packs among the first battery pack and the other battery packs. In one embodiment, if/when the first battery pack does not obtain the identifiers of any other battery packs from the other battery cabinets through the communication bus, the first battery pack may identify itself as the master battery pack. According to the technical solution provided in the embodiments of the present application, each of the battery packs connected to their respective battery cabinets is able to, according to the respective identifiers of the battery packs, automatically identify a master battery pack and one or more slave battery packs. Because a user is not required to manually configure the battery packs one by one, the complexity of the operation is reduced, and the configuration efficiency is improved. In this way, embodiments of the present application solve the shortcoming associated with the existing technology that requires a user to manually configure the battery packs one by one, thereby avoiding the complicated and time-consuming configuration process and the resulting low configuration efficiency.

Embodiment II

Figure 3:
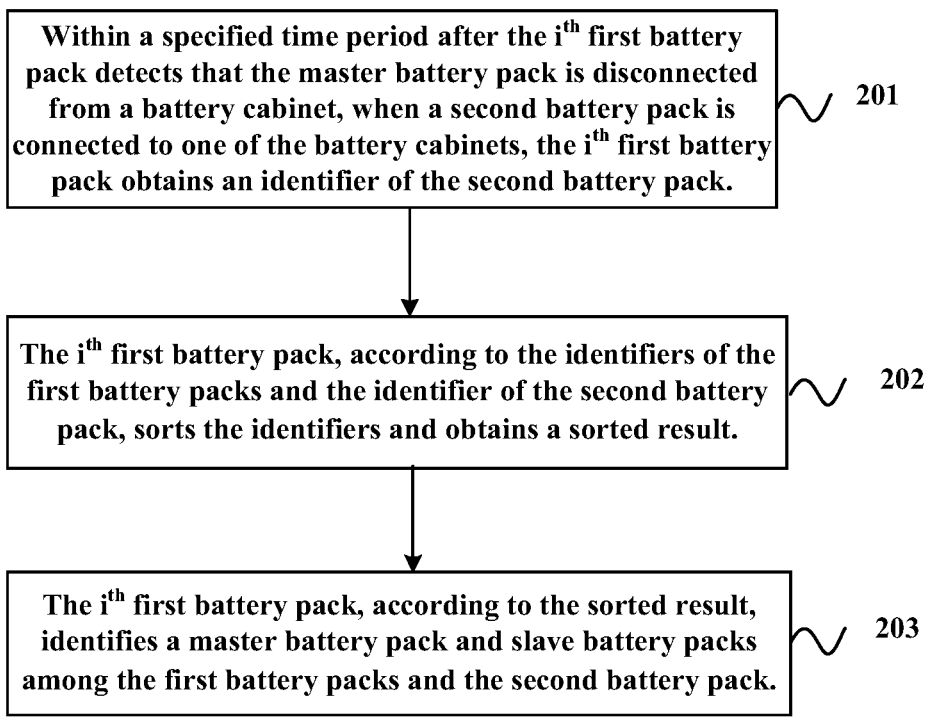
FIG. 3 is an exemplary flow chart of a second method for identifying a master battery pack and slave battery packs provided by one or more embodiments of the present invention.

FIG. 3 is an exemplary flow chart of a second method for identifying a master battery pack and slave battery packs provided by one or more embodiments of the present application. As shown in FIGS. 2 and 3, the method for identifying the master battery pack and the slave battery packs includes the steps or blocks described herein. In FIG. 3, the plurality of battery packs in the power cabinet are referred to as the first battery packs. An $i^{th}$ battery pack of the plurality of battery packs is referred to as the $i^{th}$ first battery pack.

In block 201, within a specified time period after the $i^{th}$ first battery pack detects that the master battery pack is disconnected from a battery cabinet, if/when a second battery pack is connected to one of the battery cabinets, the $i^{th}$ first battery pack obtains an identifier of the second battery pack. In one aspect, the second battery pack may be connected to the same or a different battery cabinet from which the master battery pack was disconnected.

During operation of the power cabinet, the battery cabinets in a power cabinet may be reconfigured to meet changing demands. For example, it may be desirable to increase or to decrease the number of battery cabinets. In another example, when a battery pack connected to one of the battery cabinets in the power cabinet fails, the failed battery pack may need to be removed from the battery cabinet.

Therefore, in one or more embodiments of the present application, when a battery pack needs to be removed from the battery cabinet, the battery pack may send a broadcast message through the communication bus to notify all the other battery packs that the battery pack will be removed from the battery cabinet. The battery pack to be removed may be any one of the battery packs, for example, a $j^{th}$ battery pack of the first battery packs, where j ranges from 1 to N, where N is a positive integer and N refers to the total number of battery packs in the power cabinet.

When a battery pack such as the master battery pack is removed from a power cabinet, in order to maintain the operation of the power cabinet, a new master battery pack may need to be identified to control the operation of the entire power cabinet. Therefore, in one or more embodiments of the present application, a specified time period may be set to indicate the longest time that the power cabinet may continue to operate in its current configuration. If no new battery pack is added within the specified time period, the power cabinet or the battery cabinets may select one battery pack among all of the battery packs currently in the power cabinet to be the new master battery pack.

If a new battery pack (e.g., the second battery pack) is added within the specified time period, and after the newly added second battery pack is connected to the battery cabinet, the second battery pack may obtain its own identifier. The second battery pack may broadcast a message through the communication bus to inform the other battery packs of its own identifier. For example, each of the first battery packs, including the $i^{th}$ first battery pack, may obtain the identifier of the second battery pack via the communication bus. In one aspect, the identifiers of the first battery packs and the identifier of the second battery pack are each a unique address code. In another aspect, the identifiers of the first battery packs and the identifier of the second battery pack are each a unique serial number. For a detailed description or explanation of the identifiers of the battery packs, references may be made to the description accompanying block 101 in Embodiment I, and the details of which will not be repeated herein.

For example, if there are six battery cabinets in a power cabinet, the addresses of these battery cabinets may be 0X00, 0X01, 0X02, 0X03, 0X04, and 0X05. Each of the addresses may be used to identify a battery pack. In this example, the specified time period, which indicates the longest time period that the power cabinet may continue to operate in the current configuration after the master battery pack is removed, may be set to 10 seconds. In this case, 5 seconds after the battery pack identified by address 0X00 is removed from the battery cabinet, a new battery pack may be connected to the battery cabinet with the address 0X00. The new battery pack may send a broadcast message to the other battery packs through the communication bus to inform them of its address code.

In block 202, the $i^{th}$ first battery pack, according to the identifiers of the first battery packs and the identifier of the newly added second battery pack, sorts the identifiers and obtains a sorted result. For a detailed description of how the $i^{th}$ first battery pack may sort the identifiers in block 202, references may be made to the description accompanying block 102 in Embodiment I, and the details of which will not be repeated herein.

In block 203, the $i^{th}$ first battery pack, according to the sorted result, identifies a master battery pack and slave battery packs among the first battery packs and the second battery pack. For a detailed description of how the $i^{th}$ first battery pack may identify a master battery pack and slave battery packs in block 203, references may be made to the description accompanying step 103 in Embodiment I, and the details of which will not be repeated herein. In one embodiment of the present application, in the situation where a new second battery pack is not added to the power cabinet within the specified time period in block 201, the $i^{th}$ first battery pack may identify a new master battery pack and new slave battery packs according to the last sorted result.

In one aspect, the $i^{th}$ first battery pack in block 203, according to the last sorted result, may select the battery pack with the largest identifier as the master battery pack, and each of the other battery packs as the slave battery packs. In one aspect, the $i^{th}$ first battery pack, according to the last sorted result, may select the battery pack with the smallest identifier as the master battery pack, and each of the other battery packs as the slave battery packs.

In one or more embodiments of the present application, it is understood that the last sorted result of the identifiers was determined by the last designated sorting rule. For example, suppose the last designated sorting rule was for the first $i^{th}$ battery pack to sort the identifiers according to an ascending order of the identifiers, and to select the battery pack with the largest identifier as the master battery pack, and to select the other battery packs as the slave battery packs. When the master battery pack is removed, the $i^{th}$ battery pack may identify a new master battery pack and new slave battery packs using the last designated sorting rule by selecting the battery pack with the largest identifier, excluding the removed master battery pack, as the new master battery pack, and selecting the other battery packs as the new slave battery packs.

In another example, suppose the last designated sorting rule was for the $i^{th}$ first battery pack to sort the identifiers according to a descending order of the identifiers, and to select the battery pack with the largest identifier as the master battery pack, and to select the other battery packs as the slave battery packs. When the master battery pack is removed, the $i^{th}$ battery pack may identify the new master battery pack and new slave battery packs using the last designated sorting rule by selecting the battery pack with the largest identifier, excluding the removed master battery pack, as the new master battery pack, and selecting the other battery packs as the new slave battery packs.

In another example, suppose the last designated sorting rule was for the $i^{th}$ first battery pack to sort the identifiers according to an ascending order of the identifiers, and to select the battery pack with the smallest identifier as the master battery pack, and to select the other battery packs as the slave battery packs. When the master battery pack is removed, the $i^{th}$ battery pack may identify the new master battery pack and new slave battery packs using the last designated sorting rule by selecting the battery pack with the smallest identifier, excluding the removed master battery pack, as the new master battery pack, and selecting the other battery packs as the new slave battery packs.

In another example, suppose the last designated sorting rule was for the $i^{th}$ first battery pack to sort the identifiers according to a descending order of the identifiers, and to select the battery pack with the smallest identifier as the master battery pack, and to select the other battery packs as the slave battery packs. When the master battery pack is removed, the $i^{th}$ battery pack may identify the new master battery pack and new slave battery packs using the last designated sorting rule by selecting the battery pack with the smallest identifier, excluding the removed master battery pack, as the new master battery pack, and selecting the other battery packs as the new slave battery packs.

For example, if there are six battery cabinets in a power cabinet, the addresses of these battery cabinets may be 0X00, 0X01, 0X02, 0X03, 0X04, and 0X05. Each of the addresses may be used to identify a battery pack. In this example, according to an ascending order of the identifiers, the master battery pack is the battery pack identified by the address of 0X00. The specified time period, which indicates the longest time period that the power cabinet may continue to operate in the current configuration after the master battery pack is removed, may be set to 10 seconds. In this case, after the master battery pack identified by the address 0X00 is removed from the battery cabinet, no new battery pack is connected to the battery cabinet with the address 0X00. Accordingly, 10 seconds after the removal of the master battery pack, the battery pack identified by the address 0X01 will be selected as the new master battery pack, and the other battery packs selected as the slave battery packs.

Embodiments of the present application provide a method for identifying a master and slave battery packs. After a first battery pack (e.g., the $i^{th}$ first battery pack) in the power cabinet detects that the master battery pack is removed from the battery cabinet, the first battery pack may determine whether a new battery pack (e.g., the second battery pack) is connected to the battery cabinet within a specified time period. When a new battery pack is connected to the battery cabinet within the specified time period, the first battery pack may sort the identifiers of all battery packs including the new battery pack, and may identify a new master battery pack and new slave battery packs according to the sorted result. When no new battery pack is connected to the battery cabinet within the specified time period, the first battery pack may identify the new master battery pack and the new slave battery packs according to the last sorted result of the identifiers. According to the technical solution provided in the embodiments of the present application, each of the battery packs connected to their respective battery cabinet is able to automatically identify a master and one or more slave battery packs according to the identifiers of the battery packs. The method disclosed does not require a user to manually configure the battery packs one by one. Thus, the complexity of the operation is reduced, and the efficiency of configuration is improved. In this way, embodiments of the present application solve the shortcomings in the existing technology of requiring a user to manually configure the battery packs one by one, thereby avoiding the complicated and time-consuming configuration process and the resulting low configuration efficiency.

Embodiment III

Figure 4:
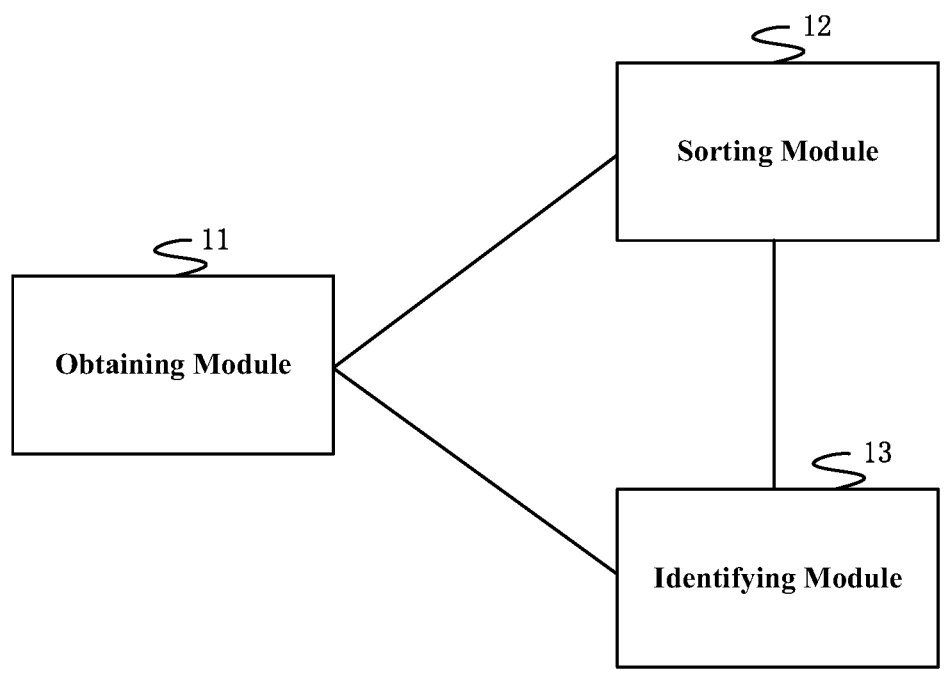
FIG. 4 is a functional block diagram of a system for identifying a master battery pack and slave battery packs provided by one or more embodiments of the present invention.

FIG. 4 is a schematic view of the structure of a device configured to practice the method of the embodiment I for identifying a master battery pack and slave battery packs according to one or more embodiments of the present application. As shown in FIG. 4, the device for identifying a master battery pack and slave battery packs in this embodiment may be included in the first battery pack. The device may include: an obtaining module 11, a sorting module 12 and an identifying module 13.

The obtaining module 11 is configured, after a first battery pack is connected to a battery cabinet, to obtain an identifier of the first battery pack, and to obtain the identifiers of other battery packs in the battery cabinet through a communication bus, where the number of the other battery packs is N, and N is a positive integer.

The sorting module 12 is configured to sort the identifier of the first battery pack and the identifier of each of the other battery packs obtained by the obtaining module 11 to generate a sorted result.

The identifying module 13 is configured, according to the sorted result generated by the sorting module 12, to identify a master battery pack and slave battery packs among the first battery pack and the other battery packs.

In one aspect, the identifier of the first battery pack and the identifier of each of a second battery pack is a unique address. In one aspect, the identifier of the first battery pack and the identifier of each of a second battery pack is a unique serial number.

In one aspect, the sorting module 12 is specifically configured to sort the identifiers according to an ascending order of the identifiers. In one aspect, the sorting module 12 is configured to sort the identifiers according to a descending order of the identifiers.

In one aspect, the identifying module 13 is specifically configured by the first battery pack, according to the sorted result, to identify the battery pack with the largest identifier as a master battery pack, and to identify each of the other battery packs as a slave battery pack. In one aspect, the identifying module 13 is configured by the first battery pack, according to the sorted result, to identify the battery pack with the smallest identifier as a master battery pack, and to identify each of the other battery packs as a slave battery pack.

In addition, the device for identifying a master battery pack and slave battery packs in one embodiment of the application may be included in a battery pack. The obtaining module 11 is further configured, after a battery pack is connected to the battery pack cabinet, to obtain the identifier of the first battery pack.

The identifying module 13 is configured, after a first battery pack is connected to the battery pack cabinet and if/when no identifier of any other battery pack is obtained through the communication bus, to identify the first battery pack itself as the master battery pack.

In one aspect, the identifier of the first battery pack and the identifier of each of the other battery packs is a unique address code. In one aspect, the identifier of the first battery pack and the identifier of each of the other battery packs is a unique serial number. The device in one embodiment of the present application may be configured to practice the technical solution of the method disclosed in the embodiment shown in FIG. 1, and because the implementation mechanisms and technical effects are similar, the details of which will not be repeated herein.

Embodiment IV

In the structure of the device shown in FIG. 4, in one embodiment of the application, the obtaining module 11 is further configured, after detecting that the master battery pack is disconnected from the battery cabinet, and if/when within a specified time period a new second battery pack is connected to the battery cabinet, to obtain the identifier of the second battery pack, where i ranges from 1 to N, where N is a positive integer, and N is the total number of battery packs in the battery cabinet.

The sorting module 12 is further configured to sort the identifiers of the first battery packs and the identifier of the second battery packs to obtain a sorted result.

The identifying module 13 is further configured, according to the sorted result generated by the sorting module, to identify a master battery pack and slave battery packs among the first battery packs and the second battery pack.

In one aspect, the identifiers of each of the first battery packs and the identifier of the second battery pack is a unique address. In one aspect, the identifiers of each of the first battery packs and the identifier of the second battery pack is a unique serial number.

In one aspect, the identifying module 13 may be further configured, after detecting that the master battery pack is disconnected from the battery cabinet, and if/when no new second battery pack is connected to the battery cabinet within a specified time period, to identify a new master battery pack and new slave battery packs according to the last sorted result of the identifiers.

In one aspect, the identifying module 13 may be configured, according to the last sorted result, to select the battery pack with the largest identifier, excluding the removed master battery pack, as the new master battery pack and each of the other battery packs as a slave battery pack. In one aspect, the identifying module may be configured, according to the last sorted result, to select the battery pack with the smallest identifier, excluding the removed master battery pack, as the new master battery pack and each of the other battery packs as a slave battery pack.

The device in this embodiment may be configured to practice the technical solution of the method disclosed in the embodiment shown in FIG. 3, and because the implementation mechanisms and technical effects are similar, the details of which will not be repeated herein.

Disclosed are several exemplary embodiments of the present invention, it should be understood that the disclosed systems, devices, and methods may be implemented in other manners or configurations. For example, the division of the systems, devices, and methods of the exemplary embodiments into the various functional blocks, components, and steps presented herein is merely one logical function division, and there may be other divisions in other embodiments. For example, multiple units, components, blocks, or steps may be combined or integrated into one another, or some of the units, components, blocks may be omitted or disabled, or some of the steps not executed. In addition, any one of the described mutual coupling, direct coupling, or communication link may be an indirect coupling or communication link connected through other interfaces, devices or units, and may be in implemented in electrical, mechanical or other forms.

Functional units described as separate components in one or more embodiments of the present application may be integrated into one processing unit, or may not be physically separate. Conversely, components displayed as one unit may or may not be located in one physical unit. A functional unit or an integrated unit may be implemented in hardware, software, or any combination of hardware and software.

It is understood to a person of ordinary skill in the art that all or part of the steps of the methods described in one or more embodiments of the application may be implemented in hardware configured to execute program instructions. The program instructions may be stored in a computer readable storage medium. When the program instructions are executed, the steps of the methods described in the embodiments may be performed. The computer readable storage medium may include various media capable of storing program codes, such as a ROM, a RAM, a magnetic disk, an optical disc, etc.

Finally, it is understood that the foregoing embodiments are presented to facilitate an understanding of the technical solutions of the present application, and are not intended to limit the present application. While the present application is described in detail with reference to the foregoing embodiments, it is understood by a person of ordinary skill in the art that modifications or changes to the foregoing embodiments may be made to part or all of the technical features without departing from the principle and scope of the disclosure of the present application. Any modifications, replacements, or improvements made within the spirit and principle of the present application should be encompassed within the scope of the present application.

What is claimed is:

1. A method for identifying a master battery pack, comprising:
   obtaining, by a first battery pack, an identifier of the first battery pack after the first battery pack is connected to a battery cabinet of a power cabinet;
   obtaining, by the first battery pack, identifiers of one or more other battery packs in their respective battery cabinets of the power cabinet through a communication bus, wherein a number of the one or more other battery packs plus the first battery pack is N, wherein N is a positive integer;
   sorting, by the first battery pack, the identifier of the first battery pack and the identifiers of the one or more other battery packs to obtain a sorted result;
   identifying, by the first battery pack, the master battery pack and one or more slave battery packs among the first battery pack and the one or more other battery packs according to the sorted result;
   detecting, by the first battery pack, that the master battery pack is removed from its battery cabinet;

detecting, by the first battery pack, that a new battery pack is not connected to any of the battery cabinets within a time period after the master battery pack is removed, wherein the time period indicates a longest time that the power cabinet continues to operate in its current configuration after the master battery pack is removed; and identifying, by the first battery pack, a new master battery pack and new slave battery packs according to the sorted result when the new battery pack is not connected to any of the battery cabinets within the time period.

2. The method of claim 1, wherein the master battery pack controls operations of the one or more slave battery packs.

3. The method according to claim 1, wherein the identifier of the first battery pack and the identifiers of the one or more other battery packs are each a unique address, or the identifier of the first battery pack and the identifiers of the one or more other battery packs are each a unique serial number.

4. The method according to claim 1, wherein said sorting, by the first battery pack, the identifier of the first battery pack and the identifiers of each of the one or more other battery packs, comprises:

sorting, by the first battery pack, all of the identifiers according to an ascending order of all of the identifiers to obtain the sorted result; or sorting, by the first battery pack, all of the identifiers according to a descending order of all of the identifiers to obtain the sorted result.

5. The method according to claim 1, wherein said identifying, by the first battery pack, the master battery pack and the one or more slave battery packs among the first battery pack and the one or more other battery packs, comprises:

identifying, by the first battery pack, a battery pack with a largest identifier as the master battery pack, and other battery packs as the one or more slave battery packs according to the sorted result; or identifying, by the first battery pack, a battery pack with a smallest identifier as the master battery pack, and other battery packs as the one or more slave battery packs according to the sorted result.

6. The method according to claim 1, wherein said identifying, by the first battery pack, the new master battery pack and the new slave battery packs according to the sorted result, comprises:

identifying, by the first battery pack, a battery pack with a largest identifier excluding the removed master battery pack as the new master battery pack, and other battery packs as the new slave battery packs according to the sorted result; or identifying, by the first battery pack, a battery pack with a smallest identifier excluding the removed master battery pack as the new master battery pack, and other battery packs as the new slave battery packs according to the sorted result.

7. A method for identifying a new master battery pack and new slave battery packs, comprising:

detecting, by an $i^{th}$ one of a plurality of first battery packs, that a master battery pack is removed from a battery cabinet of a power cabinet of the master battery pack, wherein i ranges from 1 to N, wherein N is a positive integer, wherein N is a total number of the first battery packs connected to their respective battery cabinets of the power cabinet, and wherein the first battery packs have respective identifiers;

detecting, by the $i^{th}$ one of the first battery packs, that a new battery pack is connected to one of the battery cabinets within a time period after the master battery pack is removed, wherein the time period indicates a longest time that the power cabinet continues to operate in its current configuration after the master battery pack is removed;

obtaining, by the $i^{th}$ one of the first battery packs, an identifier of the new battery pack through a communication bus;

sorting, by the $i^{th}$ one of the first battery packs, the identifiers of the first battery packs and the identifier of the new battery pack to obtain a sorted result; and identifying, by the $i^{th}$ one of the first battery packs, the new master battery pack and the new slave battery packs among the first battery packs and the new battery pack according to the sorted result.

8. The method according to claim 7, wherein the identifiers of the first battery packs and the identifier of the new battery pack are each a unique address, or the identifiers of the first battery packs and the identifier of the new battery pack are each a unique serial number.

9. The method according to claim 7, wherein said identifying, by the $i^{th}$ one of the first battery packs, the new master battery pack and the new slave battery packs among the first battery packs and the new battery pack, comprises:

identifying, by the $i^{th}$ one of the first battery packs, a battery pack with a largest identifier as the new master battery pack, and other battery packs as the new slave battery packs according to the sorted result; or identifying, by the $i^{th}$ one of the first battery packs, a battery pack with a smallest identifier as the new master battery pack, and other battery packs as the new slave battery packs according to the sorted result.

10. A device adapted to be arranged in a first battery pack, comprising:

an obtaining module configured to obtain an identifier of the first battery pack after the first battery pack is connected to a battery cabinet of a power cabinet, the obtaining module is further configured to obtain identifiers of one or more other battery packs in their respective battery cabinets of the power cabinet through a communication bus, wherein a number of the one or more other battery packs plus the first battery pack is N, wherein N is a positive integer;

a sorting module configured to sort the identifier of the first battery pack and the identifiers of the one or more other battery packs to obtain a sorted result; and an identifying module configured to identify a master battery pack and one or more slave battery packs among the first battery pack and the one or more other battery packs according to the sorted result;

characterized in that the identifying module is further configured to:

detect that the master battery pack is removed from its battery cabinet;

detect that a new battery pack is not connected to any of the battery cabinets within a time period after the master battery pack is removed, wherein the time period indicates a longest time that the power cabinet continues to operate in its current configuration after the master battery pack is removed; and identify a new master battery pack and new slave battery packs according to the sorted result when the new battery pack is not connected to any of the battery cabinets within the time period.

11. The device according to claim 10, wherein the identifier of the first battery pack and the identifiers of the one or more other battery packs are each a unique address, or the identifier of the first battery pack and the identifiers of the one or more other battery packs are each a unique serial number.

12. The device according to claim 10, wherein the sorting module is further configured to
sort all of the identifiers according to an ascending order of all of the identifiers to obtain the sorted result, or to sort all of the identifiers according to a descending order of all of the identifiers to obtain the sorted result.

13. The device according to claim 10, wherein the identifying module is further configured to identify a battery pack with a largest identifier as the master battery pack, and other battery packs as the one or more slave battery packs according to the sorted result, or to identify a battery pack with a smallest identifier as the master battery pack, and other battery packs as the one or more slave battery packs according to the sorted result.

14. The device according to claim 10, wherein the identifying module is further configured to:
identify a battery pack with a largest identifier excluding the removed master battery pack as the new master battery pack, and other battery packs as the new slave battery packs according to the sorted result, or
identify a battery pack with a smallest identifier excluding the removed master battery pack as the new master battery pack, and other battery packs as the new slave battery packs according to the sorted result.

15. The device according to claim 10, wherein the identifying module is further configured to:
detect that the new master battery pack is removed from the battery cabinet of the new master battery pack;
detect that another new battery pack is connected to one of the battery cabinets within the time period after the new master battery pack is removed; and
obtain an identifier of the another new battery pack,
and wherein the sorting module is further configured to sort all of the identifiers including the identifier of the another new battery pack to obtain another sorted result, and wherein the identifying module is further configured to identify another new master battery pack and new slave battery packs among all of the battery packs including the another new battery pack according to the another sorted result.

16. The device according to claim 15, wherein the identifiers of all of the battery packs including the identifier of the another new battery pack are each a unique address, or the identifiers of all of the battery packs including the identifier of the another new battery pack are each a unique serial number.

* * * * *